United States Patent [19]

Uchida et al.

[11] Patent Number: 5,334,670

[45] Date of Patent: Aug. 2, 1994

[54] ELASTOMER AND PROCESS FOR PRODUCTION THEREOF

[75] Inventors: Yuji Uchida, Kanagawa; Yoshio Yoshida, Tokyo; Toshikazu Kaneda, Kanagawa; Toshiaki Moriya, Kanagawa; Tsutomu Kumazawa, Kanagawa, all of Japan

[73] Assignee: Mitsui Toatsu Chemicals, Inc., Tokyo, Japan

[21] Appl. No.: 167,072

[22] Filed: Dec. 15, 1993

Related U.S. Application Data

[62] Division of Ser. No. 837,030, Feb. 14, 1992.

[30] Foreign Application Priority Data

May 14, 1991 [JP] Japan .................................. 3-136992

[51] Int. Cl.$^5$ ............................................. C08G 63/06
[52] U.S. Cl. ..................................... 525/440; 525/443; 525/444.5; 525/454; 525/459
[58] Field of Search ..................... 525/443, 440, 444.5, 525/454, 459

[56] References Cited

U.S. PATENT DOCUMENTS 5,125,974  6/1992  Mafoti ............................... 106/243

Primary Examiner—James J. Seidleck
Assistant Examiner—Mary Critharis
Attorney, Agent, or Firm—Burns, Doane, Swecker & Mathis

[57] ABSTRACT

An elastomer is molded by a reaction injection molding of polyurethane resins, polyurea resins, polyurethane/urea resins and polyurea/amide resins in the presence of an internal release agent which is a polyester condensate of a saturated or unsaturated fatty acid having a hydroxy group produced by transesterification or a molecular end-aminated or iminated polyester condensate. The elastomer has a good releasing property and a good coating property.

14 Claims, No Drawings

ELASTOMER AND PROCESS FOR PRODUCTION THEREOF

This application is a divisional, of application Ser. No. 07/837,030, filed Feb. 14, 1992, pending.

BACKGROUND OF THE INVENTION

1. Field of the Invention

The present invention relates to an elastomer molded by reaction injection molding, and more particularly, to an elastomer molded by a reaction injection molding of polyurethane resins, polyurea resins, polyurethane/urea resins and/or polyurea/amide resins using a composition containing a polyester condensate as an internal release agent, and a process for production thereof.

2. Description of the Related Art

Methods for producing molding articles of polyurethane resins, polyurea resins, and other synthetic resins by means of reaction injection molding (hereinafter referred to as "RIM") are known.

RIM is an injection molding method comprising sufficiently mixing an active hydrogen component and a polyisocyanate component and then rapidly curing and molding the resulting mixture in a mold, and it is a tape of so-called "one-shot" molding methods.

The "active hydrogen component" is a component having a functional group containing an active hydrogen capable of reacting with an isocyanate group. The functional groups containing an active hydrogen are hydroxyl group, amino group, imino group (including enamine in the relation of tautomerism with imino group) and the like. The reaction of a hydroxyl group with an isocyanate group is a urethane condensation and the resulting resin is a polyurethane resin. In the following, when an amino group reacts with an isocyanate group, the resulting resin is called "polyurea resin"; when both hydroxyl group and amino group react with isocyanate groups, the resulting resin is called "polyurethane/urea resin"; and when an imino group reacts with an isocyanate group, the resulting resin is called "polyurea/amide resin".

In a RIM technique, elastomers such as polyurethane, polyurea and the like mean non-foamed elastomers, micro-cellular elastomers and the like, and the density is about 0.8 g/cm$^3$ or more. When no filler is contained, the upper limit of density is 1.2 g/cm$^3$. The elastic elastomers are used for external parts of a car and the like.

A feature of RIM resides in the short molding time between injection of the material and releasing the molded article, but the total time for the molding cycle is not yet sufficiently short at present. A big problem in shortening the time for the molding cycle is that a long time is required for cleaning the mold and applying a release agent thereto. In order to solve this problem, it is important from a standpoint of productivity that molded articles can be easily released from molds. For attaining this purpose, various internal release agents have been developed.

It is desired that internal release agents exhibit excellent solvent stability in the raw materials and excellent releasability from molds, and neither disturb the reactivity upon heat curing nor cause fish eyes, defective adhesion and the like upon coating the resulting molded article.

Japanese Patent Application Laid-open No. Sho 61-91216 discloses an internal release agent for producing a polyurethane elastomer having an average density of 0.8–1.4 g/cm$^3$. The internal release agent is an ester group-containing condensate produced from 3–15 moles of ricinoleic acid and 1 mole of monohydric or polyhydric alcohol which has a molecular weight of 900–4500, an acid value of 5 or less and an OH value of 12.5–125.

The ester group-containing condensate derived from ricinoleic acid exhibits solvent stability in the material and gives a good coating property.

However, the releasing property is not sufficient and further reducing the acid value to 2 or less is very difficult in the synthesis, and therefore, when a large amount of the internal release agent is added, the polyaddition reaction of polyurethane is disturbed.

Further, when a molded article is released from a mold, the stiffness of the polyurethane molded article is so poor that deformation is liable to occur, and therefore, the handling in production becomes complicated and the productivity is markedly deteriorated. In addition, with respect to physical properties, the heat resistance is lowered.

The present inventors intensively carried out research to develop elastomers exhibiting excellent continuous releasability and coating property. As a result, they have found that ester group-containing condensates derived from 12-hydroxystearic acid and alkanediol do not lower stiffness and heat resistance as to the physical properties of molded articles and the resulting invention has been already filed for a patent application as Japanese Patent Application No. Hei 2 - 214311.

The present inventors have found that an elastomer excellent in continuous releasability and coating property can be produced by using an internal release agent produced by reacting a hydroxy fatty acid ester or a mixture of said ester and a polyether polyol with a diisocyanate to prepare a prepolymer and substituting the ends of the molecule of the prepolymer with amino group (hereinafter called "end-amine-modifying technique"), and this invention has been filed as Japanese Patent Application No. Hei 2 -246282.

The present inventors have continued the research and found that when the condensation of an ester of a saturated fatty acid having a hydroxyl group with an alkanediol or diol having an ether group is carried out by transesterification, there is obtained an ester group-containing condensate having a very low acid value and a remarkably improved releasing property as compared with a conventional ester group-containing condensate produced by dehydration of fatty acids and alkanediols (hereinafter called "transesterification technique").

The present inventors have further found that when this transesterification technique is applied to the above-mentioned end-amine-modifying technique, the characteristics of the internal release agent are further improved.

As a result, the present invention has been totally accomplished.

SUMMARY OF THE INVENTION

An object of the present invention is to provide an elastomer exhibiting excellent releasability from a mold.

Another object of the present invention is to provide a molded elastomer having a good coating property.

A further object of the present invention is to provide an internal release agent of a low acid value that does not disturb the a polyaddition reaction of polyurethane and the like.

Still another object of the present invention is to provide elastomer exhibiting excellent releasability in reaction injection molding.

A still-further object of the present invention is to provide an elastomer capable of improving the productivity of reaction injection molding.

According to one aspect of the present invention, there is provided an elastomer molded by reaction injection molding of a member selected from the group consisting of polyurethane resins, polyurea resins, polyurethane/urea resins and polyurea/amide resins using a composition containing a member selected from the group consisting of a polyester condensate of a saturated fatty acid having a hydroxy group produced by transesterification, a polyester condensate of an unsaturated fatty acid having a hydroxy group produced by transesterification, and a polyester condensate having an amino and/or imino group at the end of the molecule derived from the above-mentioned polyester condensates as an internal release agent.

According to another aspect of the present invention, there is provided a process for producing an elastomer by a reaction injection molding which comprises reacting, in a closed mold, a mixture having an isocyanate index of 70–130 comprising (a) an organic polyisocyanate,
(b) a polyol having at least two active hydrogen groups and a molecular weight of 800–12000 or a polyether polyamine or polyether polyimine having such a structure that the ends of said polyol are substituted with a member selected from the group consisting of primary amino, secondary amino, aromatic primary amino, and imino, and
(d) an internal release agent containing a member selected from the group consisting of a polyester condensate of a saturated fatty acid having a hydroxy group produced by transesterification, a polyester condensate of an unsaturated fatty acid having a hydroxy group produced by transesterification, and a polyester condensate having an amino and/or imino group at the end of the molecule derived from the above-mentioned polyester condensates.

DESCRIPTION OF THE PREFERRED EMBODIMENTS

In the present invention, the polyester condensate of a saturated fatty acid having a hydroxy group used in the elastomer may be a polyester condensate of the formula,

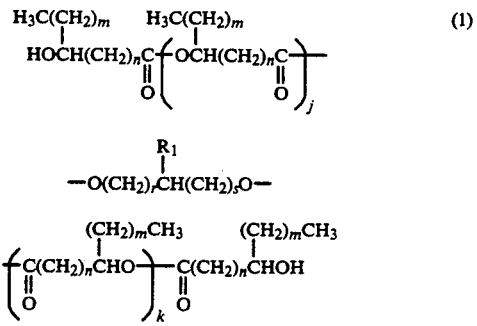

where m and n are integers and the total of m and n is 13–15, r and s are integers of 0–7 and the total of r and s is 1–7, j and k are integers and the total of j and k is 1–25, and $R_1$ is selected from the group consisting of hydrogen and $C_1$–$C_4$ alkyl, or a polyester condensate of the formula,

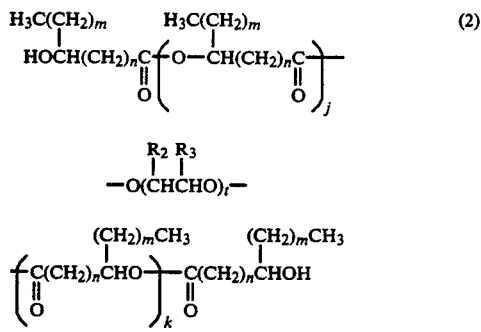

where m and n are integers and the total of m and n is 13–15, t is an integer of 1–4, j and k are integers and the total of j and k is 1–25, $R_2$ and $R_3$ are similar or dissimilar and selected from the group consisting of hydrogen and $C_1$–$C_4$ alkyl. The polyester condensate of a saturated fatty acid having a hydroxy group is preferably a condensate of a 12-hydroxystearic acid ester of the formula,

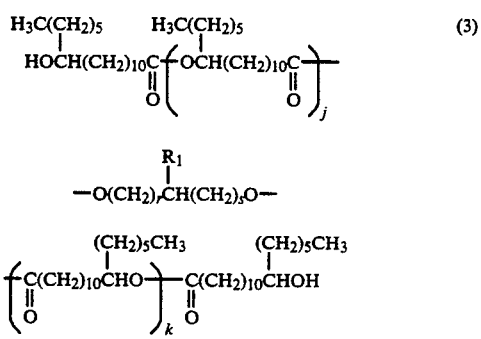

where r and s are integers of 0–7 and the total of r and s is 1–7, j and k are integers and the total of j and k is 1–25, and $R_1$ is selected from the group consisting of hydrogen and $C_1$–$C_4$ alkyl, or that of the formula,

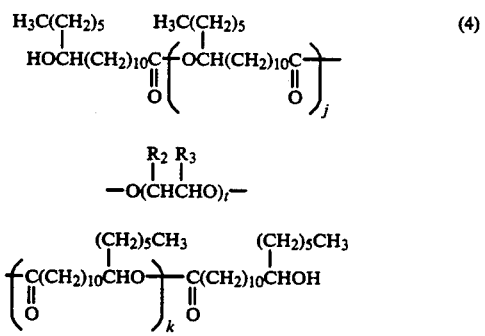

where t is an integer of 1–4, j and k are integers and the total of j and k is 1–25, $R_2$ and $R_3$ are similar or dissimilar and selected from the group consisting of hydrogen and $C_1$–$C_4$ alkyl. Further the polyester condensate of a saturated fatty acid having a hydroxy group may be that having an average molecular weight of 1000–8000 and a hydroxyl value of 5–70 and prepared by transesterification of a saturated aliphatic ester of the formula,

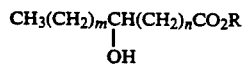 (5)

where R is $C_1$-$C_4$ alkyl, m and n are integers and the total of m and n is 13-15, with
a member selected from the group consisting of an alkanediol of the formula,

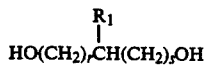 (6)

where r and s are integers of 0-7 and the total of r and s is 1-7, and $R_1$ is a member selected from the group consisting of hydrogen and $C_1$-$C_4$ alkyl, and
a diol of the formula,

 (7)

where t is an integer of 1-4 and $R_2$ and $R_3$ are similar or dissimilar and selected from the group consisting of hydrogen and $C_1$-$C_4$ alkyl.

The polyester condensate of an unsaturated fatty acid having a hydroxy group may be a condensate of a ricinoleic acid ester such as a condensate of the formula,

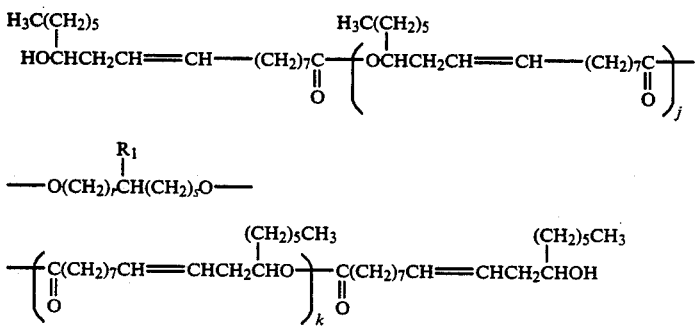 (8)

where r and s are integers of 0-7 and the total of r and s is 1-7, j and k are integers and the total of j and k is 1-25, and $R_1$ is selected from the group consisting of hydrogen and $C_1$-$C_4$ alkyl, and a condensate of the formula,

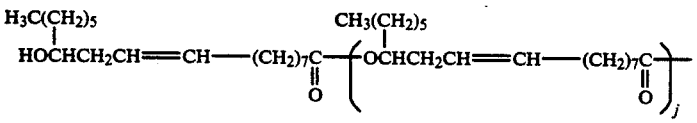

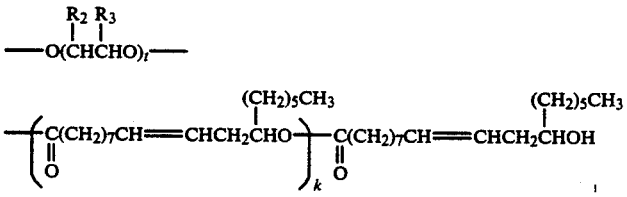 (9)

where t is an integer of 1-4, 3 and k are integers and the total of j and k is 1-25, $R_2$ and $R_3$ are similar or dissimilar and selected from the group consisting of hydrogen and $C_1$-$C_4$ alkyl.

The polyester condensate of an unsaturated fatty acid having a hydroxy group is preferably that having an average molecular weight of 1000-8000 and a hydroxyl value of 5-70 and prepared by transesterification of an unsaturated aliphatic ester of the formula,

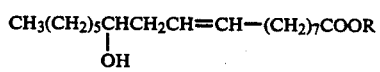 (10)

where R is $C_1$-$C_4$ alkyl, with an alkanediol of the formula (6) as above or a diol of the formula (7) as above.

The above-mentioned molecular end-amino or imino substituted polyester condensate may be a product produced by reacting the composition containing a polyester condensate of a saturated fatty acid having a hydroxy group produced by transesterification and/or a polyester condensate of an unsaturated fatty acid having a hydroxy group with a diisocyanate to produce a prepolymer and reacting the resulting prepolymer with at least one of aromatic polyamide, polyether polyamine, and polyether polyimine.

Exemplary suitable aromatic amines include the compounds of the formulas,

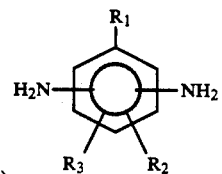 (11)

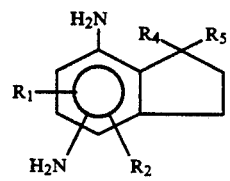 (12)

-continued

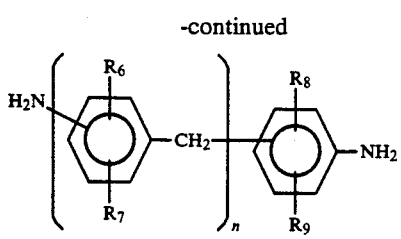

(13)

where $R_1$, $R_2$, $R_3$, $R_4$ and $R_5$ are independently selected from the group consisting of hydrogen and alkyl having 1-10 carbon atoms; when at least one of $R_1$, $R_2$ and $R_3$ is alkyl in formula (11), the alkyl is at the ortho position with respect to at least one amino group; when at least one of $R_1$ and $R_2$ is alkyl in formula (12), the alkyl is at the ortho position with respect to at least one amino group; and $R_6$, $R_7$, $R_8$ and $R_9$ are independently selected from the group consisting of hydrogen and alkyl having 1-10 carbon atoms and n is an integer of 1-10.

As the polyether polyamine, there may be used that having a primary or secondary amino group at the ends of the polyol.

As the polyether polyimine, there may be used that having an imino group at the ends of the polyol.

The elastomer of the present invention may be produced by a reaction injection molding which comprises reacting, in a closed mold, a mixture having an isocyanate index of 70-130 comprising (a) an organic polyisocyanate,
(b) a polyol having at least two active hydrogen groups and a molecular weight of 800-12000 or a polyether polyamine or polyether polyimine having such a structure that the ends of said polyol are substituted with a member selected from the group consisting of primary amino, secondary amino, aromatic primary amino, and imino,
(d) an internal release agent which is a composition containing a member selected from the group consisting of a polyester condensate of a saturated fatty acid having a hydroxy group produced by transesterification, a polyester condensate of an unsaturated fatty acid having a hydroxy group produced by transesterification, and a polyester condensate having an amino and/or imino group at the end of the molecule derived from the above-mentioned polyester condensates.

In the above-mentioned process, there is preferably used (c) a chain extending agent containing 5-80 parts by weight of an aromatic diamine per 100 parts by weight of the total of the (b) component.

The polyester condensate in the internal release agent as the (d) component is preferably used in an amount of 0.5-30 parts by weight per 100 parts by weight of the total of the (b) component.

The polyester condensate of the present invention may be produced, for example, by a transesterification reaction of a lower alcohol ester of a hydroxy saturated or unsaturated fatty acid with a glycol.

As hydroxy saturated fatty acid esters [formula (5) as above] used in the present invention, there may be mentioned methyl esters, ethyl esters, propyl esters, isopropyl esters, butyl esters, isobutyl esters and the like of 8-hydroxystearic acid, 9-hydroxystearic acid, 10-hydroxystearic acid, 11-hydroxystearic acid, 12-hydroxystearic acid, 8-hydroxypalmitic acid, 9-hydroxypalmitic acid, 10-hydroxypalmitic acid, 11-hydroxypalmitic acid, and 12-hydroxypalmitic acid.

Exemplary suitable hydroxy unsaturated fatty acid esters used in the present invention include esters of ricinoleic acid (12-hydroxy-cis-9-octadecenoic acid), ricinoelaidic acid (12-hydroxy-trans-9-octadecenoic acid), 16-hydroxy-Δ9,10-hexadecenoic acid and the like.

It is difficult in industrial production to use these hydroxy saturated or unsaturated fatty acid esters of high purity, and therefore, the compounds containing saturated or unsaturated fatty acid esters having no hydroxyl group (for example, 5-15 %) originating from the raw materials are usually used, but these compounds do not affect the reaction and the resulting polyester condensate is not adversely affected.

As glycols used in the present invention, the compounds of formula (6) above include
1,2-ethanediol,
1,2-propanediol,
1,3-propanediol,
1,2-butanediol,
1,3-butanediol,
1,4-butanediol,
1,5-pentanediol,
1,6-hexanediol,
1,7-heptanediol,
1,8-octanediol
and the like, and
the compounds of formula (7) above include 2,3-butanediol, diethylene glycol, triethylene glycol, tetraethylene glycol, dipropylene glycol, tripropylene glycol, tetrapropylene glycol and the like.

The amount of the glycols is preferably 5-30 equivalents per 100 equivalents of the hydroxy fatty acid ester used for the reaction. When the condensation reaction is carried out using such amount ratio as above, there are finally obtained polyester condensates having an average molecular weight of 1000-8000 and a hydroxyl value of 5-70.

When the amount of glycol is less than 5 equivalents, the releasing property of the polyester condensate is low, and when it exceeds 30 equivalents, the molecular weight of the polyester condensate does not increase and therefore, the viscosity is so high and the fluidity is so low that the compatibility with the raw materials is poor and the viscosity of the raw materials becomes high. As a result, the molding property is degraded.

The reaction temperature for carrying out the condention is not critical, and may be 100°-250° C., preferably, 170°-210° C. The reaction can proceed in the absence of a catalyst, but the reaction time necessary for condensation can be shortened by using a catalyst.

As the catalyst, there may be used conventional esterification catalysts, for example, inorganic acids such as sulfuric acid, hydrochloric acid, phosphoric acid and the like, and organic acids such as p-toluenesulfonic acid, methanesulfonic acid and the like, and furthermore, alkoxy titanium, acidic ion exchange resins and the like.

The condensation reaction proceeds at atmospheric pressure. However, it is preferable to effect the reaction under reduced pressure since the lower alcohol formed by condensation can be removed by operating under reduced pressure and this removal serves to shorten the time for condensation.

The pressure may be about 10-100 mm Hg.

The reaction time varies depending on reaction temperature and types of hydroxy fatty acid esters used, but 20-50 hours are sufficient for the reaction time.

The end point of the reaction can be determined by measurement of molecular weight by means of gel column chromatography and measurement of the hydroxyl number.

After completion of the reaction, the resulting ester condensate can be used as a release agent as it is. The polyester condensate thus prepared can be used as an internal release agent for molding polyurethane resins, polyurea resins, polyurethane/urea resins, and polyurea/amide resins by reaction injection molding according to the present invention, and elastomers can be produced.

According to the present invention, as the internal release agent there may be also used a composition containing a polyester condensate having an amino and/or imino group at the end of the molecule derived from a polyester condensate of a saturated and/or unsaturated fatty acid having a hydroxy group produced by transesterification.

This molecular end-amino or imino substituted polyester condensate is a derivative of a polyester condensate of a saturated and/or unsaturated fatty acid having a hydroxy group produced by transesterification, and may be produced by aminating or iminating directly the polyester condensate of a saturated or unsaturated fatty acid having a hydroxy group, or aminating or iminating a derivative thereof containing said polyester condensate as an essential moiety.

The molecular end-amino or imino substituted polyester condensate can be produced, for example, by the following procedures.

The following (A) component is reacted with the following (B) component at a ratio of one equivalent of (A) component to at least two equivalents of (B) component.

(A) Component:
A prepolymer obtained by the reaction of a diisocyanate with a polyester condensate of a saturated or unsaturated fatty acid having a hydroxy group, or a mixture of said polyester condensate and a polyol.

(B) Component:
A member selected from aromatic polyamines, polyether polyamines and polyether polyimines (hereinafter called "polyamine-polyimine component") and a mixture of the polyamine polyimine component and a polyol.

Exemplary suitable diisocyanates as starting materials for component (A) are:
aliphatic diisocyanates such as
ethylene diisocyanate,
tetramethylene-1,4-diisocyante,
hexamethylene-1,6-diisocyanate,
dodecane-1, 12-diisocyanate,
and the like;
alicyclic diisocyanates such as
cyclobutane-1,3-diisocyanate,
cyclobutane-1,4-diisocyanate,
1-isocyanato-3,3,5-trimethyl-5-isocyanatomethyl-cyclohexane,
hexahydrotolylene-2,4-diisocyanate,
hexahydrotolylene-3,6-diisocyanate,
hexahydrophenylene-1,3-diisocyanate,
hexahydrophenylene-1,4-diisocyanate,
perhydrodiphenylmethane-2,4-diisocyanate,
perhydrodiphenylmethane-4,4'-diisocyanate,
and the like;
aralkyl diisocyanate such as
$\alpha,\alpha,\alpha',\alpha'$-tetramethyl-xylylene diisocyanate (TMXDI) and the like; and
aromatic diisocyanates such as
phenylene-1,3-diisocyanate,
phenylene-1,4-diisocyanate,
tolylene-2,4-diisocyanate,
tolylene-2,6-diisocyanate,
diphenylmethane-2,4'-diisocyanate,
diphenylmethane-4,4'-diisocyanate,
naphthylene-1,5-diisocyanate,
and the like.

Diisocyanates which are liquid at room temperature are preferable. In particular, tolylene-2,4-diisocyanate, tolylene-2,6-diisocyanate or mixtures of isomers thereof, $\alpha,\alpha,\alpha',\alpha'$-tetramethyl-xylylene diisocyanate, and 1-isocyanato-3,3,5-trimethyl-5-isocyanatomethyl-cyclohexane, are preferable.

The prepolymer of component (A) of the present invention may be prepared by mixing the above-mentioned polyester condensate or said polyester condensate and polyol with the above-mentioned diisocyanate and reacting them.

The NCO content in the prepolymer of conponent (A) is preferably 0.5–5%, more preferably 0.5–2%. A NCO content of 5% or less is preferable since gelation of the reaction product in the reaction with component (b) can be prevented while a NCO content of 0.5% or more is preferable since the viscosity of the product of the reaction of component (A) with component (B) does not become high.

The prepolymer may be preferably prepared by reacting one equivalent of the polyester condensate or a mixture of the polyester condensate and a polyol with 1–2 equivalents of a diisocyanate, more preferably 1.3–1.8 equivalents of a diisocyanate.

When the amount of the diisocyanate exceeds 2 equivalents, free isocyanate is present in the resulting prepolymer and thereby gelation of the product of the reaction with component (B) is liable to occur.

As mentioned above, the 37 polyamine-polyimine component" used in component (B) is a member selected from the group consisting of aromatic polyamines, polyether polyamines and polyether polyimines. These members may be used alone or in combination.

Exemplary suitable aromatic polyamines include:
2,4- or 2,6-diaminotoluene,
2,4'- or 4,4'-diamino-diphenylmethane,
1,3- or 1,4-phenylenediamine,
polyphenyl-polymethylene-polyamines prepared by condensation of aniline and formaldehyde,
and liquid or soluble aromatic diamines described in Japanese Patent Publication No. 17359/1979, the disclosure of which is herein incorporated by reference, such as
1,3-diethyl-2,4-diaminobenzene,
2,4-diaminomesitylene,
1-methyl-3,5-diethyl-2,4-diaminobenzene,
1-methyl-3,5-diethyl-2,6-diaminobenzene,
1,3,5-triethyl-2,6-diaminobenzene,
3,5,3',5'-tetramethyl-4,4'-diaminodiphenyl-methane,
1,1-dimethyl-4,6-dimethyl-5,7-diaminoindane,
and the like.

A particularly suitable aromatic polyamine is a mixture of 1-methyl-3,5-diethyl-2,4-diaminobenzene and 1-methyl-3,5-diethyl-2,6-diaminobenzene (hereinafter referred to as "DETDA").

Further, the aromatic polyamines represented by the formulas (11), (12) and (13) as mentioned above also may be used.

The polyether polyamines may be prepared by substituting the molecular ends of a polyol with a primary amino or secondary amino group.

Further, the polyether polyamines may be polyether polyamines described in Japanese Patent Publication No. 56887/1988, the disclosure of which is herein incorporated by reference. For example, aromatic polyether polyamines having terminal amino groups can be prepared by reacting polyol with tolylene diisocyanate and hydrolyzing the resulting product with a large excess of water, or aliphatic polyether polyamines having terminal primary amino groups can be prepared by reacting polypropylene glycol with ammonia.

The polyether polyimines may be prepared by substituting the molecular ends of polyols with imino groups.

Further, the polyether polyamine used in the present invention is preferably a polyether polyimine prepared by dehydrating an aliphatic polyether polyamine having terminal primary amino groups together with cyclohexanone, as described in Japanese Patent Application Laid-open No. 273623/1988, the disclosure of which is herein incorporated by reference.

More preferable aliphatic polyether polyamines having terminal primary amine groups are Jeffamine D-230, D-400, and D-2000 manufactured by Texaco Co. and the like.

The amount of polyamine-polyimine component, or a mixture of polyamine-polyimine component and polyol in component (B) used in the present invention is preferably 2 equivalents or more, more preferably 5 equivalents or more, particularly preferably 10 equivalents or more per one equivalent of the prepolymer of component (A).

When component (B) is used in an amount of 2 equivalents or more per one equivalent of the prepolymer of component (A), it is possible to avoid residual isocyanates in the resin composition, and therefore, the activity of the resin can be retained and a better releasing property is exhibited.

Aromatic polyamines, polyether polyamines or polyether polyimines of component (B) are preferably liquid at room temperature. However, even if a component (B) is not liquid, the component (B) can be used by heating and dissolving the component (B) in polyol in advance.

The polyol used for component (A) or (B) is preferably a polyol having two hydroxyl groups or more at the ends of the molecule.

For example, the polyols may be chemically prepared by a polyaddition of an epoxide such as ethylene oxide, propylene oxide, butylene oxide, tetrahydrofuran, styrene oxide, epichlorohydrin and the like to an initiator having a reactive hydrogen atom such as water, alcohols, ethylene glycol, propylene glycol, trimethylol propane, 4,4-dihydroxy-diphenylpropane, aniline, ethanolamine, ethylenediamine in the presence of $BF_3$. In addition, there may be used a product prepared by transesterification of terminal hydroxyl groups of polyol with castor oil. The molecular weight of the polyether polyol is preferably 800-12000. If necessary, a polyol having a molecular weight of 800-12000 may be used as a solvent for the reaction of component (A) with component (B) or as a viscosity decreasing agent.

The prepolymer of component (A) may be prepared by the reaction of a polyester condensate with a diisocyanate, but it is preferable to use additionally a polyol since the solubility in resins increases and the continuous releasing characteristic is further improved.

As the polyol used for the prepolymer of component (A), all of the above-mentioned polyols may be used, and polypropylene diols of a molecular weight of 2000-4000 are particularly preferable.

The molecular end-amino or imino substituted polyester condensate may be produced by a two-step reaction.

In the first step, a diisocyanate is reacted with the polyester condensate (or a mixture of the polyester condensate and a polyol) to obtain a prepolymer, component (A).

In the second step, the resulting prepolymer, component (A), is reacted with a polyamine-polyimine component or a mixture of a polyamine-polyimine component and a polyol, component (B), the amount of component (A) being one equivalent and that of component (B) being two equivalents or more, and the molecular end-amino or imino substituted polyester condensate is obtained.

In the following, the preparation procedure is explained referring to a case where there is used a hydroxy fatty acid ester prepared by using ricinoleic acid or 12-hydroxystearic acid.

The isocyanate reactive composition may be produced by a two-step reaction. In the first step, a self-condensation product having a hydroxyl value of 12-125 and an acid value not higher than 10 of ricinoleic acid or 12-hydroxystearic acid, or an ester compound having a hydroxyl value of 12-125 and acid value not higher than 10 produced from ricinoleic acid and/or 12-hydroxystearic acid and an alkanediol [e.g. formula (6) as above] or a diol [e.g. formula (7) as above] is subjected to a transesterification reaction with a similar alkanediol [e.g. formula (6) as above] or a similar diol [e.g. formula (7) as above] to form a polyester condensate and then a composition containing the polyester condensate is reacted with a diisocyanate to produce a prepolymer (A) containing 0.5-5% NCO.

In the second step, one equivalent of a prepolymer of the component (A) is reacted with 2 equivalents or more (as total equivalent) of component (B) such as aromatic polyamines, polyols and polyether polyimines to prepare an isocyanate reactive resin composition which is liquid at room temperature and comprises a compound having a structure that at least one amino or imino group is attached to the ends of the prepolymer (A) molecule. The resulting product can be used as an internal release agent.

In the following, the process for preparation of the elastomer is explained in detail.

As organic polyisocyanates of the component (a), there may be used known aliphatic, alicyclic or aromatic polyisocyanatesor the like, for example, 4,4'-diphenylmethane diisocyanate, 2,4-and/or 2,6-tolylene diisocyanate, polymethylene polyphenyl polyisocyanate, xylylene diisocyanate, polyisophorone diisocyanate, other aliphatic polyisocyanates, or dimers, trimers, carbodiimide modified compounds, prepolymers of the above-mentioned isocyanates.

In particular, aromatic polyisocyanates some of which are liquid at room temperature, for example, 4,4'-diphenylmethane diisocyanate, a mixture of said diisocyanate and homologues thereof, modified isocyanates prepared by reacting said isocyanates with compounds having polyfunctional hydroxy groups or modifying said isocyanate by carbodiimidizing are preferable.

As a polyol in component (b), there may be mentioned, for example, polyhydric alcohols such as ethylene glycol, propylene glycol, diethylene glycol, triethylene glycol, dipropylene glycol, glycerine, trimethylol propane, 1,3,6-hexanetriol, pentaerythritol, sorbitol and the like, polyether polyols prepared by polyaddition of alkylene oxides to the above-mentioned polyhydroxy compounds, and the like.

Further, there may be used alkanolamines such as diethanolamine, triethanolamine and the like; polyether polyols prepared by polyaddition reaction of ethylene oxide, propylene oxide, styrene oxide or the like with amines having at least two active hydrogen atoms such as ethylenediamine, diethylenetriamine, ammonia, aniline, tolylenediamine, xylylenediamine, diaminodiphenylmethane and the like; polytetramethylene ether glycol and the like.

In addition, there may be used polyester polyols of higher fatty acids, polyester polyols prepared by reacting polycarboxylic acids with low molecular weight polyols, polyester polyols prepared by polymerization of caprolactones, polycarbonate polyols, and higher fatty acid esters having hydroxyl group such as castor oil, dehydrated caster oil and the like.

Still further, there maybe used polymerpolyols prepared by graft reaction of the above-mentioned known polyols with ethylenic unsaturated compound such as styrene, acrylonitrile, methyl methacrylate and the like, 1,2- or 1,4-polybutadiene polyols or hydrogenated products thereof. These compounds may be used alone or in combination.

It should be noted that the above-mentioned polyols also may be used as polyols employed as an ingredient of the (A) component and the (B) component for producing the previously mentioned molecular end-amino or imino substituted polyester condensates.

Examples of polyether polyamines or polyether polyimines of component (b) include polyethers having such a structure that the ends of the polyols of the above-mentioned component (b) are substituted with primary amino, secondary amino, aromatic primary amino or imino.

Preferable examples are Jeffamine T - 5000, D - 2000 manufactured by Texaco Chemical Co. disclosed in U.S. Pat. No. 4,396,729; N-(polyoxyalkyl)-N-(alkyl)amine having a molecular weight of about 600 prepared by reacting a polyoxyalkylene ether polyol having a hydroxyl value of 28 mg KOH/g with diisopropylamine under pressurized hydrogen in the presence of a catalyst disclosed in Japanese Patent Application Laid-open No. Sho 64-81816; and polyoxyalkylene ether polyol having amino groups at the ends and having NH value of 44.3 [KOH (mg)/g], acid value of 0.1 [KOH (mg)/g], molecular weight of 2500 and viscosity (mPa.s: 75° C.) produced by hydrolyzing, according to the above-mentioned method, NCO-pre-adduct (NCO value, 3.4%) prepared from tolylene-2,4-diisocyanate and polypropylene glycol ether (average molecular weight 2000) disclosed in Japanese Patent Application Laid-open No. Sho 58-41857.

Examples of polyethers having imino group at the ends include a polyether imine, commercially available Jeffamine supplied by Texaco Chemical Co. prepared by dehydration of polyether amine and cyclohexanone disclosed in working examples of Japanese Patent Application Laid-open No. Sho 63-273623.

Examples of aromatic diamines of component (c) used as a chain extending agent include aromatic diamines having at least one alkyl substituents at the ortho positions with respect to an amino group, in particular, preferably aromatic primary diamines having at least one alkyl substituent at the ortho positions with respect to a first amino group and two alkyl substituents, each having 1-4 carbon atoms, at ortho positions with respect to a second amino group.

Examples of preferable aromatic diamines are:
2,4-diaminomesitylene,
1,3,5-triethyl-2,4-diaminobenzene,
1,3,5-triisopropyl-2,4-diaminobenzene,
1-methyl-3,5-diethyl-2,4-diaminobenzene,
1-methyl-3,5-diethyl-2,6-diaminobenzene,
4,6-dimethyl-2-ethyl-1,3-diaminobenzene,
3,5,3',5'-tetraisopropyl-4,4'-diaminodiphenyl methane,
3,5-diethyl-3',5-diisopropyl-4,4'-diaminodiphenyl methane,
1,3-dimethyl-5-tert-butyl-4,6-diaminobenzene,
1,3-dimethyl-5-tert-butyl-2,6-diaminobenzene,
1-methyl-5-tert-butyl-2,4-diaminobenzene,
1-methyl-3-tert-butyl-2,6-diaminobenzene,
5,7-diamino-1,14,6-tetramethylindane, and
mixtures of such diamines as above.

1-Methyl-3,5-diethyl-2,4-diaminobenzene, a mixture of 1-methyl-3,5-diethyl-2,4-diaminobenzene and 1-ethyl-3,5-diethyl-2,6-diaminobenzene, and 5,7-diamino-1,1,4,6-tetramethylindane are particularly preferable.

The amount of the aromatic diamine of component (c) is preferably about 5-80 parts by weight, more preferably 8-30 parts by weight based on 100 parts by weight of the polyol, polyether polyamine or polyether polyimine of the above-mentioned component (b).

As component (c), there may be used mixtures of aromatic diamines and low molecular weight alkanediols such as ethylene glycol, propylene glycol, 1,4-butanediol and the like. In this case, the preferable or more preferable amount of the aromatic diamine is the same as above except that 100 parts by weight of the total of the polyol etc. in components (b) and (c) is used as the basis in place of 100 parts by weight of the polyol etc. of component (b) only.

Another additive which may be used in the present invention is a catalyst capable of accelerating the polyaddition reaction of an isocyanate with an isocyanate-reactive functional group. The catalysts are particularly tin salts of carboxylic acids, dialkyl tin salts of carboxylic acids, dialkyl tin mercaptide, dialkyl tin dithio ester and tertiary amines.

As further additives, there may be used a foam controlling agent represented by polydimethyl polysiloxane, and foaming agents such as water and/or easily vaporable organic substances and/or dissolved inert gases.

According to the present invention, there can be obtained molded articles of elastomers exhibiting excellent release from a mold and excellent coating property, and capable of improving productivity to a great extent.

The internal release agent provided according to the present invention has a low acid value so that the polyaddition reaction of polyurethane and the like is not disturbed. An elastomer having a markedly improved releasing property and a good coating property can be obtained by reaction injection molding.

In the following, preparation examples for internal release agents are shown and the present invention is explained in detail referring to examples. Parts are by weight unless otherwise stated.

PREPARATION EXAMPLE 1 (Internal release agent - 1)

Ricinoleic acid 2089 parts, 1,6-dihydroxyhexane 118 parts and titanium tetrabutyrate 0.11 parts (50 ppm) were subjected to condensation according to the procedure of Example I of Japanese Patent Application Laid-open No. Sho 61-91216. That is, the above-mentioned components were placed in a reactor, heated to 180° C., and the resulting water was removed for four hours at atmospheric pressure. Then, the pressure was gradually lowered down to 15 mm Hg and further the water of reaction was removed. All water containing a small amount of organic components was distilled away for further 7.5 hours.

The reaction mixture was kept at 15 mm Hg for a further hour and then cooled. The resulting condensate containing an ester group had an acid value of 3.8 mg KOH/g, hydroxyl value of 36.5 mg KOH/g and viscosity of 995 cps/25° C.

PREPARATION EXAMPLE 2 ( Internal release agent - 2 )

In a vessel equipped with a stirrer and a reflux condenser were placed ricinoleic acid 600 g, methanol 1.3 liters and p-toluenesulfonic acid 3 g and refluxed for three hours.

After completion of the reaction, excess methanol was distilled away and then the residue was washed with 700 ml of a warm water (70°-80° C.) 4 times and dehydrated to obtain the methyl ester.

To the methyl ester were added 1,6-hexanediol 33.9 g, tetrabutoxy titanium 0.05 ml and the reaction was carried out at a temperature of 190°-200° C. at atmospheric pressure for 10 hours and then at 10-20 mm Hg for further 30 hours to obtain a polyester condensate.

Yield : 595 g. Acid value : 0.2. Hydroxyl value : 36 mg KOH/g. Average molecular weight : about 3000.

PREPARATION EXAMPLE 3 (Internal release agent - 3)

12-Hydroxystearic acid 2103 parts, 1,6-dihydroxyhexane 118 parts and titanium tetrabutyrate 0.11 parts were subjected to condensation following the procedure for producing internal release agent - 1 as above.

The resulting condensate had an acid value of 2.7 mg KOH/g, hydroxyl value of 32.2 mg KOH/g, and viscosity of 1320 cps/25° 1 C.

PREPARATION EXAMPLE 4 (Internal release agent - 4)

In a vessel equipped with a stirrer and a reflux condenser were placed 12-hydroxystearic acid (87% in purity, the other main component being stearic acid) 600 g, methanol 1.3 liter and p-toluenesulfonic acid 3 g and refluxed for three hours. After completion of the reaction, excess methanol was distilled away, and the resulting residue was washed with 700 ml of a warm water (70°-80° C.) four times and dehydrated to obtain the methyl ester. To the resulting methyl ester were added 1,6-hexanediol 33.7 g and tetrabutoxy titanium 0.05 ml, and a reaction was effected at 190°-200° C. at atmospheric pressure for 10 hours and at 10-20 mm Hg for further 30 hours to produce a polyester condensate.

Yield : 590 g. Acid value : 0.4 Hydroxyl value : 10 mg KOH/g. Average molecular weight : about 3000.

PREPARATION EXAMPLE 5 (Internal release agent - 5)

In a vessel equipped with a stirrer and a reflux condenser were placed 9(10)-hydroxystearic acid 515 g, methanol 1.2 liter and p-toluenesulfonic acid 3 g and refluxed for 3 hours.

After completion of the reaction, excess methanol was distilled away, and the residue was washed with 700 ml of a warm water (70°-80° C.) four times and dehydrated to obtain the methyl ester. To the methyl ester were added 1,6-hexanediol 33.7 g and tetrabutoxy titanium 0.05 ml and a reaction was carried out at 190°-200° C. at atmospheric pressure for 10 hours and at 10-20 mm Hg for further 30 hours to produce a polyester condensate.

Yield : 490 g. Acid value : 0.7. Hydroxyl value : 15 mg KOH/g. Average molecular weight : about 3000

PREPARATION EXAMPLE 6 (Internal release agent - 6)

Transesterification concerning ricinoleic acid and molecular end-amination

Six equivalents (522 g) of TDI - 100 was reacted with four equivalents (6222 g) of the above-mentioned internal release agent - 2 at 100° C. for 2 hours to prepare a prepolymer having NCO %=1.30%.

To a solution composed of 5,7-diamino-1,1,4,6-tetramethylindane, 25 parts (0.2451 equivalent parts), and polyol A (infra) 100 parts (0.0606 equivalent parts), was dropwise added the above-mentioned TDI prepolymer, 9 parts (0.00279 equivalent parts), at room temperature and then stirring was effected for one hour.

After one day, NCO absorption of the product was measured by infrared absorption spectrum, but no NCO absorption was recognized.

Active hydrogen value (mg/KOH) : 123 Viscosity (cps/25° C.) : 1900.

PREPARATION EXAMPLE 7 (Internal release agent - 7)

Transesterification concerning 12-hydroxystearic acid and molecular end-amination Two equivalents (174 g) of TDI was reacted with one equivalent (5610 g) of the above-mentioned internal release agent - 4 at 100° C. for two hours to prepare a prepolymer having NCO %=0.76%.

25 part (0.2451 equivalent parts) of 5,7-diamino-1,1,4,6-tetramethylindane and 100 parts (0.0606 equivalent parts) of polyol A (infra) were mixed to form a solution, and to the resulting solution was added dropwise 9 parts (0.00162 equivalent parts) of the above-mentioned TDI prepolymer at room temperature and then stirring was effected for one hour.

After one day, NCO absorption was measured by infrared absorption spectrum, but no absorption of NCO was recongnized.

Active hydrogen value (mg/KOH) : 123. Viscosity (cps/25° C.) : 4000.

PREPARATION EXAMPLE B (Internal release agent - 8)

Transesterification concerning 12-hydroxystearic acid and molecular end-amination Two equivalents (220 g) of α,α,α',α'-tetramethylxylylene diisocyanate (m - TMXDI, manufactured by Takeda Seiyaku K.K.) was reacted with one equivalent (5610 g) of the above-mentioned internal release agent - 4 at 100° C. for two hours to prepare a prepolymer having NCO % =0.76%.

To 39 parts (0.4380 equivalent parts) of Ethacure 100 (manufactured by Ethyl-Corp.) was dropwise added 9 parts (0.00162 equivalent parts) of the prepolymer as prepared above at room temperature and the resulting mixture was stirred for one hour.

After one day, NCO absorption was measured by means of infrared absorption spectrum, but no NCO absorption was recognized.

Active hydrogen value (mg/KOH) : 507. Viscosity (cps/25° C.) : 4000.

PREPARATION EXAMPLE (Internal release agent - 9)

Transesterification concerning ricinoleic acid and molecular end-amination

Six equivalents (660 g) of $\alpha,\alpha,\alpha',\alpha'$-tetramethyl-xylylene diisocyanate (m - TMXDI, manufactured by Takeda Seiyaku K.K.) was reacted with 4 equivalents (6233 g) of the above-mentioned internal release agent - 2 at 100° C. for 2 hours to prepare a prepolymer having NCO % =1.25%.

To 11.8 parts (0.1325 equivalent parts) of Ethacure 100 (manufactured by Ethyl-Corp.) was added dropwise 9 parts (0.00267 equivalent parts) of the above-mentioned prepolymer at room temperature and stirring was effected for one hour.

After one day, NCO absorption was measured by infrared absorption spectrum, but no NCO absorption was recognized.

Active hydrogen value (mg/KOH) : 350. Viscosity (cps/25° C.) : 4000

PREPARATION EXAMPLE 10 (Internal release agent - 10)

Transesterification concerning 12-hydroxystearic acid and molecular end-amination To 11.8 parts (0.1325 equivalent parts) of Ethacure 100 (manufactured by Ethyl-Corp.) was dropwise added 9 parts (0.00162 equivalent parts) of the prepolymer prepared in preparation Example 8 at room temperature and then stirring was effected for one hour.

After one day, NCO absorption was measured by infrared absorption spectrum, but no NCO absorption was recognized.

Active hydrogen value (mg/KOH) : 353. Viscosity (cps/25° C.) : 10000.

In the following, the present invention is concretely explained referring to examples, but the examples should not be construed as limitation thereto.

The components used in the following Examples and Comparison Examples are as shown below.
1) Internal release agent
   (1) : The above-mentioned internal release agent - 1
   (2) : The above-mentioned internal release agent - 2
   (3) : The above-mentioned internal release agent - 3
   (4) : The above-mentioned internal release agent - 4
   (5) : The above-mentioned internal release agent - 5
   (6) : The above-mentioned internal release agent - 6
   (7) : The above-mentioned internal release agent - 7
   (8) : The above-mentioned internal release agent - 8
   (9) : The above-mentioned internal release agent - 9
   (10) : The above-mentioned internal release agent - 10
2) Polyol A:
   EP-33ON manufactured by Mitsui Toatsu Chemicals, Inc.
   Poly(oxyalkylene)polyethertriol starting with a glycerine moiety, having a hydroxyl value (OH value) of 34, containing about 85% of propylene oxide and having about 15% of ethylene oxide at the end portion
3) Polyether polyamine B having an amino group at the end portion : Jeffamine D-2000 manufactured by Texaco Chemical Co.
4) Chain extending agent C:
   Ethacure 100 manufactured by Ethyl-Corp
   An isomer mixture of 1-methyl-3,5-diethyl-2,4-diaminobenzene and 1-methyl-3,5-diethyl-2,6-diaminobenzene (about 80:20)
5) Chain extending agent D : 5,7-diamino-1,1,4,6-tetramethylindane
6) Compatibilizer E:
   Jeffamine D-400 manufactured by Texaco Chemical Co.
   Polyetherdiamine having amino group at the ends and a molecular weight of about 400
7) Compatibilizer F:
   AE-300 manufactured by Mitsui Toatsu Chemicals, Inc.
   Polyether polyol having an OH value of 750 prepared by adding propylene oxide to ethylene diamine
8) Polyisocyahate G:
   Prepolymer prepared by reacting tripropylene glycol with 4,4'-diphenylmethane diisocyanate (MDI)
   NCO %=22.5%
   Viscosity=800 cps/25° C.
9) Polyisocyanate H:
   Prepolymer prepared by reacting Jeffamine D-2000 with 4,4'-diphenylmethane diisocyanate
   NCO %=22.2%
   Viscosity=500 cps/25° C.
10) Tin catalyst: Start BL manufactured by Sankyo Yuki K.K. Dibutyl tin dilaurate
11) Amine catalyst: DABCO 33LV manufactured by Air Product
12) Zinc stearate: Zinc stearate GF-200 manufactured by Nippon Yushi K.K.
13) Paint
   Primer : Flexen-600 primer manufactured by Bee-Chemical Co.
   Top coat : Flexen-105 (white) manufactured by Bee-Chemical Co.

EXAMPLES 1-11 and COMPARISON EXAMPLES 1-6

Polyol A or polyether polyamine B, chain extending agents C and D, compatibilizers E and F, internal release agents (1)–(10), zinc stearate, catalyst and polyisocyanates G and H were used as shown in Table 1–Table 3 (figures corresponding to these materials are shown in parts by weight) below and polyurethane elastomers were prepared under the following conditions.

That is, an active hydrogen compound (Liquid A) mainly composed of a polyol or polyether polyamine, a chain extending agent, an internal release agent and a catalyst and an isocyanate (Liquid B) were fed to respective raw material tanks for a high pressure foaming machine (Toho Kikai NR-230), and Liquid A and Liquid B were mixed in the high pressure foaming machine and then injected into a simple bumper mold (U-shaped; about 500 cc in volume, wall thickness of 3 mm).

The surface of the mold was washed with DMF and then an external release agent D - 186 wax manufactured by Chukyo Yushi K.K. was applied to the resulting surface by means of spraying.

The release test was conducted by coating the simple bumper mold with the external release agent by spraying the external release agent once and measuring how many times the release can be continuously effected from the undermold.

The coating test was carried out under the following conditions. One hour after the molding, post-cure was effected at 120° C. for 30 min. After the post-cure, the mold was allowed to stand at room temperature for one hour, and then the molded sample was washed and de-fatted with a vapor of 1,1,1-trichloroethane (manufactured by Central Glass Co.). The sample thus washed and de-fatted was coated with Flexen-600 primer and heating was effected at 120° C. for 20 min. and then allowed to stand at room temperature for 30 min. Then Flexen 105 (white) Top Coat was applied to the 20 sample and heating was effected at 120° C. for 30 min.

| | Evaluation |
|---|---|
| Fish eye | Observed with eyes |
| Adhesive test | JIS D0202 Crosshatch test, Class 1 |

The result of Examples is shown in Table 1 and Table 2 and that of Comparison Examples in Table 3.

TABLE 1

| | | Example | | | | | |
|---|---|---|---|---|---|---|---|
| | | 1 | 2 | 3 | 4 | 5 | 6 |
| Polyol | A | 100 | 100 | 100 | 100 | 100 | |
| Polyether polyamine | B | | | | | | 100 |
| Chain extending | C | | 21.8 | | 21.8 | | |
| agent | D | 25 | | 25 | | 25 | 45 |
| Compatibilizer | E | | | | | | |
| | F | | | | | | |
| Internal release | 1 | | | | | | |
| agent | 2 | 9 | 9 | | | | |
| | 3 | | | | | | |
| | 4 | | | 9 | 9 | | 8 |
| | 5 | | | | | 9 | |
| Zinc stearate | | | | | | | |
| Catalyst | Stan BL | 0.15 | 0.15 | 0.15 | 0.15 | 0.15 | 0.15 |
| | DABCO 33LV | 0.15 | 0.15 | 0.15 | 0.15 | 0.15 | 0.15 |
| Polyisocyanate | G | 61.3 | 61.3 | 61.3 | 61.3 | 61.3 | |
| | H | | | | | | 108.4 |
| Continuous releasability | | 48 | 45 | 52 | 49 | 47 | 70+ |
| Coating test | | | | | | | |
| Fish eye (Appearance) | | None | None | None | None | None | None |
| Crosshatch adhesive test | | 100/100 | 100/100 | 100/100 | 100/100 | 100/100 | 100/100 |
| Type of internal release agent | | Ricinoleic acid Transesterification | Ricinoleic acid Transesterification | 12-Hydroxystearic acid Transesterification | 12-Hydroxystearic acid Transesterification | 9(10-hydroxy-)stearic acid Transesterification | 12-Hydroxystearic acid Transesterification |

Continuous releasability "70+" stands for "70 times or more".

TABLE 2

| | | Example | | | | |
|---|---|---|---|---|---|---|
| | | 7 | 8 | 9 | 10 | 11 |
| Polyol | A | 0 | 100 | 0 | 100 | |
| Polyether polyamine | B | | | | | 100 |
| Chain extending agent | C | | 10 | | 10 | |
| | D | | | | | |
| Compatibilizer | E | | | | | |
| | F | | | | | |
| Internal release | 6 | 134 | | | | |
| agent | 7 | | | 134 | | |
| | 8 | | | | | 48 |
| | 9 | | 20.8 | | | |
| | 10 | | | | 20.8 | |
| Zinc stearate | | | | | | |
| Catalyst | Stan BL | 0.15 | 0.15 | 0.15 | 0.15 | |
| | DABCO 33LV | 0.15 | 0.15 | 0.15 | 0.15 | |
| Polyisocyanate | G | 57.6 | 58.8 | 57.6 | 58.8 | |
| | H | | | | | 106.0 |
| Continuous releasability | | 80+ | 80+ | 80+ | 80+ | 100+ |
| Coating test | | | | | | |
| Fish eye (Appearance) | | None | None | None | None | None |
| Crosshatch adhesive test | | 100/100 | 100/100 | 100/100 | 100/100 | 100/100 |
| Type of internal release agent | | Ricinoleic acid Transesterification TDI | Ricinoleic acid Transesterification TMXDI | 12-Hydroxystearic acid Transesterification TDI | 12-Hydroxystearic acid Transesterification TMXDI | 12-Hydroxy stearic acid Transesterification TMXDI |

Continuous releasability "80+" and "100+" stand for "80 times or more" and "100 times or more", respectively.

TABLE 3

| | | Comparison Example | | | | | |
|---|---|---|---|---|---|---|---|
| | | 1 | 2 | 3 | 4 | 5 | 6 |
| Polyol | A | 100 | 100 | 100 | 100 | 100 | 100 |
| Polyether polyamine | B | | | | | | |
| Chain extending agent | C | | | 21.8 | | 21.8 | 22 |
| | D | 25 | 25 | | 25 | | |
| Compatibilizer | E | | | | | | 2.5 |
| | F | | | | | | 2.5 |
| Internal release agent | 1 | | 9 | 9 | | | |
| | 2 | | | | | | |
| | 3 | | | | 9 | 9 | |
| Zinc stearate | | | | | | | 2.5 |
| Catalyst | Stan BL | 0.15 | 0.15 | 0.15 | 0.15 | 0.15 | 0.15 |
| | DABCO 33LV | 0.15 | 0.15 | 0.15 | 0.15 | 0.15 | 0.15 |
| Polyisocyanate | G | 60.3 | 61.5 | 61.5 | 61.3 | 61.3 | 68.5 |
| | H | | | | | | |
| Continuous releasability | | 1 | 20 | 22 | 24 | 22 | 45 |
| Coating test | | | | | | | |
| Fish eye (Appearance) | | None | None | None | None | None | Present |
| Crosshatch adhesive test | | 100/100 | 100/100 | 100/100 | 100/100 | 100/100 | 100/100 |
| Type of internal release agent | | None | Ricinoleic acid Dehydration | Ricinoleic acid Dehydration | 12-Hydroxy-stearic acid Dehydration | 12-Hydroxy-stearic acid Dehydration | Zinc stearate |

What is claimed is:

1. An elastomer composition molded by a reaction injection molding of a member selected from the group consisting of polyurethane resins, polyurea resins, polyurethane/urea resins and polyurea/amide resins, said composition containing a polyester condensate as an internal release agent, said polyester condensate having a hydroxyl group and further having an amino and/or imino group at the end of the molecule and being derived from a polyester condensate produced by transesterification of a saturated or unsaturated fatty acid having a hydroxyl group.

2. An elastomer according to claim 1 in which the polyester condensate having a hydroxyl group and further having an amino and/or imino group at the end of the molecule is derived from a condensate selected from the group consisting of a polyester condensate of the formula,

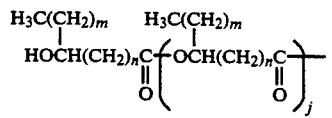  (1)

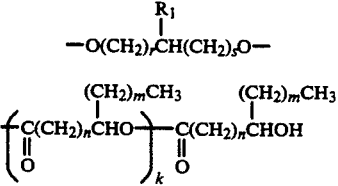

where m and n are integers and the total of m and n is 13-15, r and s are integers of 0-7 and the total of r and s is 1-7, j and k are integers and the total of j and k is 1-25, and $R_1$ is selected from the group consisting of hydrogen and $C_1$-$C_4$ alkyl, and a polyester condensate of the formula,

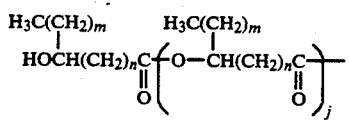  (2)

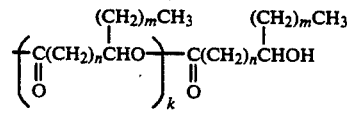

where m and n are integers and the total of m and n is 13-15, t is an integer of 1-4, j and k are integers and the total of j and k is 1-25, $R_2$ and $R_3$ are similar or dissimilar and selected from the group consisting of hydrogen and $C_1$-$C_4$ alkyl.

3. An elastomer according to claim 2 in which the polyester condensate having a hydroxyl group and further having an amino and/or imino group at the end of the molecule is derived from a condensate of a 12-hydroxystearic acid ester selected from the group consisting of a condensate of the formula,

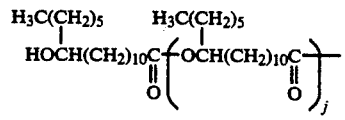  (3)

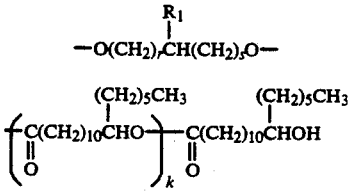

where r and s are integers of 0-7 and the total of r and s is 1-7, j and k are integers and the total of j and k is 1-25, and $R_1$ is selected from the group consisting of hydrogen and $C_1$-$C_4$ alkyl, and condensate of the formula,

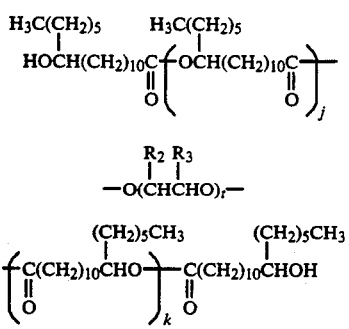

$$-O(\overset{R_2}{\underset{|}{C}}H\overset{R_3}{\underset{|}{C}}HO)_t-$$

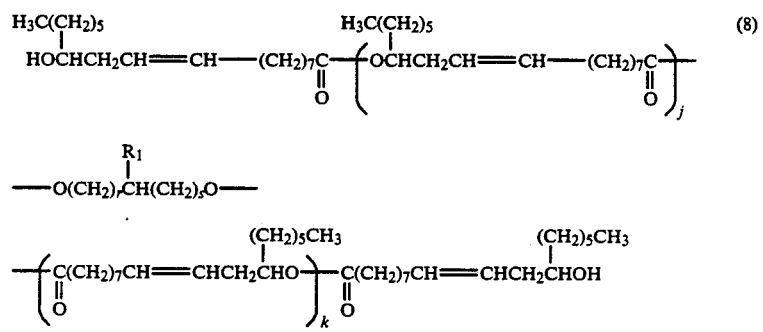

where t is an integer of 1–4, j and k are integers and the total of j and k is 1–25, $R_2$ and $R_3$ are similar or dissimilar and selected from the group consisting of hydrogen and $C_1$–$C_4$ alkyl.

4. An elastomer according to claim 2 in which the polyester condensate having a hydroxyl group and further having an amino and/or imino group at the end of the molecule is derived from a polyester condensate having an average molecular weight of 1000–8000 and a hydroxyl value of 5–70 and is prepared by transesterification of a saturated aliphatic ester of the formula, $$CH_3(CH_2)_m\underset{\underset{OH}{|}}{C}H(CH_2)_nCO_2R \qquad (5)$$

where R is $C_1$–$C_4$ alkyl, m and n are integers and the total of m and n is 13–15, with
a member selected from the group consisting of an alkanediol of the formula,

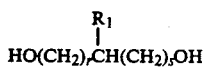

where r and s are integers of 0–7 and the total of r and s is 1–7, and $R_1$ is a member selected from the group consisting of hydrogen and $C_1$–$C_4$ alkyl, and a diol of the formula, $$HO(\overset{R_2}{\underset{|}{C}}H\overset{R_3}{\underset{|}{C}}HO)_tH \qquad (7)$$

where t is an integer of 1–4 and $R_2$ and $R_3$ are similar or dissimilar and selected from the group consisting of hydrogen and $C_1$–$C_4$ alkyl.

5. An elastomer according to claim 14 in which the polyester condensate having a hydroxyl group and further having an amino and/or imino group at the end of the molecule is derived from a condensate of a ricinoleic acid ester selected from the group consisting of a condensate of the formula,

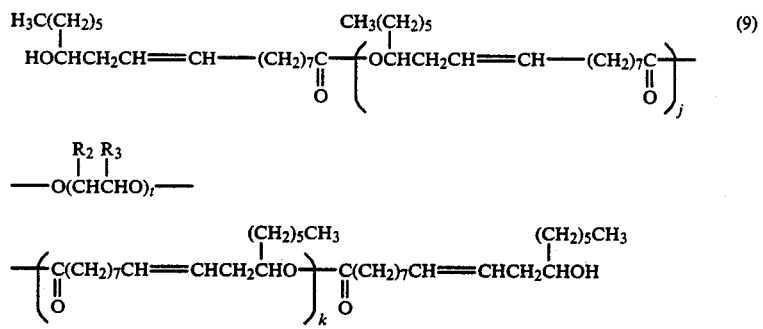

where r and s are integers of 0–7 and the total of r and s is 1–7, j and k are integers and the total of j and k is 1–25, and $R_1$ is selected from the group consisting of hydrogen and $C_1$–$C_4$ alkyl, and a condensate of the formula,

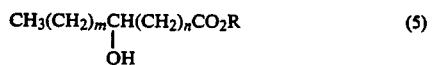

$$-O(\overset{R_2}{\underset{|}{C}}H\overset{R_3}{\underset{|}{C}}HO)_t-$$

where t is an integer of 1–4, j and k are integers and the total of j and k is 1–25, $R_2$ and $R_3$ are similar or dissimilar and selected from the group consisting of hydrogen and $C_1$–$C_4$ alkyl.

6. An elastomer according to claim 5 in which the polyester condensate having a hydroxyl group and further an amino and/or imino group at the end of the molecule is derived from a polyester condensate having an average molecular weight of 1000–8000 and a hydroxyl value of 5–70 and is prepared by transesterification of a saturated aliphatic ester of the formula,

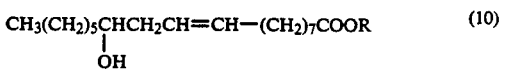

where R is $C_1$-$C_4$ alkyl,
with a member selected from the group consisting of
an alkanediol of the formula,

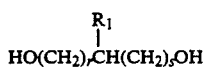  (6)

where r and s are integers of 0–7 and the total of r and s is 1–7, and $R_1$ is a member selected from the group consisting of hydrogen and $C_1$-$C_4$ alkyl, and
a diol of the formula,

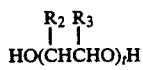  (7)

where t is an integer of 1–4 and $R_2$ and $R_3$ are similar or dissimilar and selected from the group consisting hydrogen and $C_1$-$C_4$ alkyl.

7. An elastomer according to claim 1 in which the polyester condensate having an amino and/or imino group at the end of the molecule is a product produced by reacting the composition containing a member selected from the group consisting of a polyester condensate of a saturated fatty acid having a hydroxy group produced by transesterification and a polyester condensate of an unsaturated fatty acid having a hydroxy group with a diisocyanate to produce a prepolymer and reacting the resulting prepolymer with a member selected from the group consisting of aromatic polyamines, polyether polyamines, and polyether polyimines.

8. An elastomer according to claim 7 in which the aromatic amine is a member selected from the group consisting of compounds of the formulas,

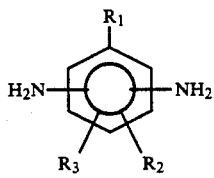  (11)

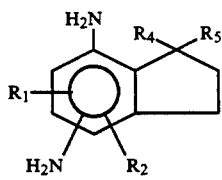  (12)

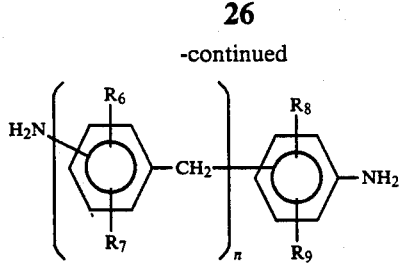  (13)

where $R_1$, $R_2$, $R_3$, $R_4$ and $R_5$ are independently selected from the group consisting of hydrogen and alkyl having 1–10 carbon atoms; when at least one of $R_1$, $R_2$ and $R_3$ is alkyl in formula (11), the alkyl is at the ortho position with respect to at least one amino group; when at least one of $R_1$ and $R_2$ is alkyl in formula (12), the alkyl is at the ortho position with respect to at least one amino group; and $R_6$, $R_7$, $R_8$ and $R_9$ are independently selected from the group consisting of hydrogen and alkyl having 1–10 carbon atoms and n is an integer of 1–10.

9. An elastomer according to claim 7 in which the polyether polyamine is prepared by substituting the molecular ends of a polyol with a primary or secondary amino group.

10. An elastomer according to claim 7 in which the polyether polyimine is prepared by substituting the molecular ends of a polyol with an imino group.

11. A process for producing an elastomer by a reaction injection molding which comprises reacting, in a closed mold, a mixture having an isocyanate index of 70–130 comprising
(a) an organic polyisocyanate,
(b) a polyol having at least two active hydrogen groups and a molecular weight of 800–12000 or a polyether polyamine or polyether polyimine having such a structure that the ends of said polyol are substituted with a member selected from the group consisting of primary amino, secondary amino, aromatic primary amino, and imino, and
(d) an internal release agent as recited in claim 1.

12. A process according to claim 11 in which there is used (c) a chain extending agent containing 5–80 parts by weight of an aromatic diamine per 100 parts by weight of the total of the (b) component.

13. A process according to claim 12 in which the polyester condensate in the internal release agent is present in an amount of 0.5 to 30 parts by weight per 100 parts by weight of the total of the (b) component.

14. A process according to claim 11 in which the polyester condensate in the internal release agent is present in an amount of 0.5 to 30 parts by weight per 100 parts by weight of the total of the (b) component.

* * * * *

UNITED STATES PATENT AND TRADEMARK OFFICE
CERTIFICATE OF CORRECTION

PATENT NO. : 5,334,670

DATED : August 2, 1994

INVENTOR(S) : Uchida et al.

It is certified that error appears in the above-identified patent and that said Letters Patent is hereby corrected as shown below:

Claim 2, column 22, line 39, "tis" should be two words as follows: --t is--.

Claim 5, column 24, line 13, "14" should be --1--.

Claim 6, column 24, line 59, after "further" insert --having--;

column 25, line 20, after "consisting" insert --of--.

Signed and Sealed this

Twenty-eight Day of February, 1995

Attest:

BRUCE LEHMAN

*Attesting Officer*     *Commissioner of Patents and Trademarks*